# UNITED STATES PATENT OFFICE.

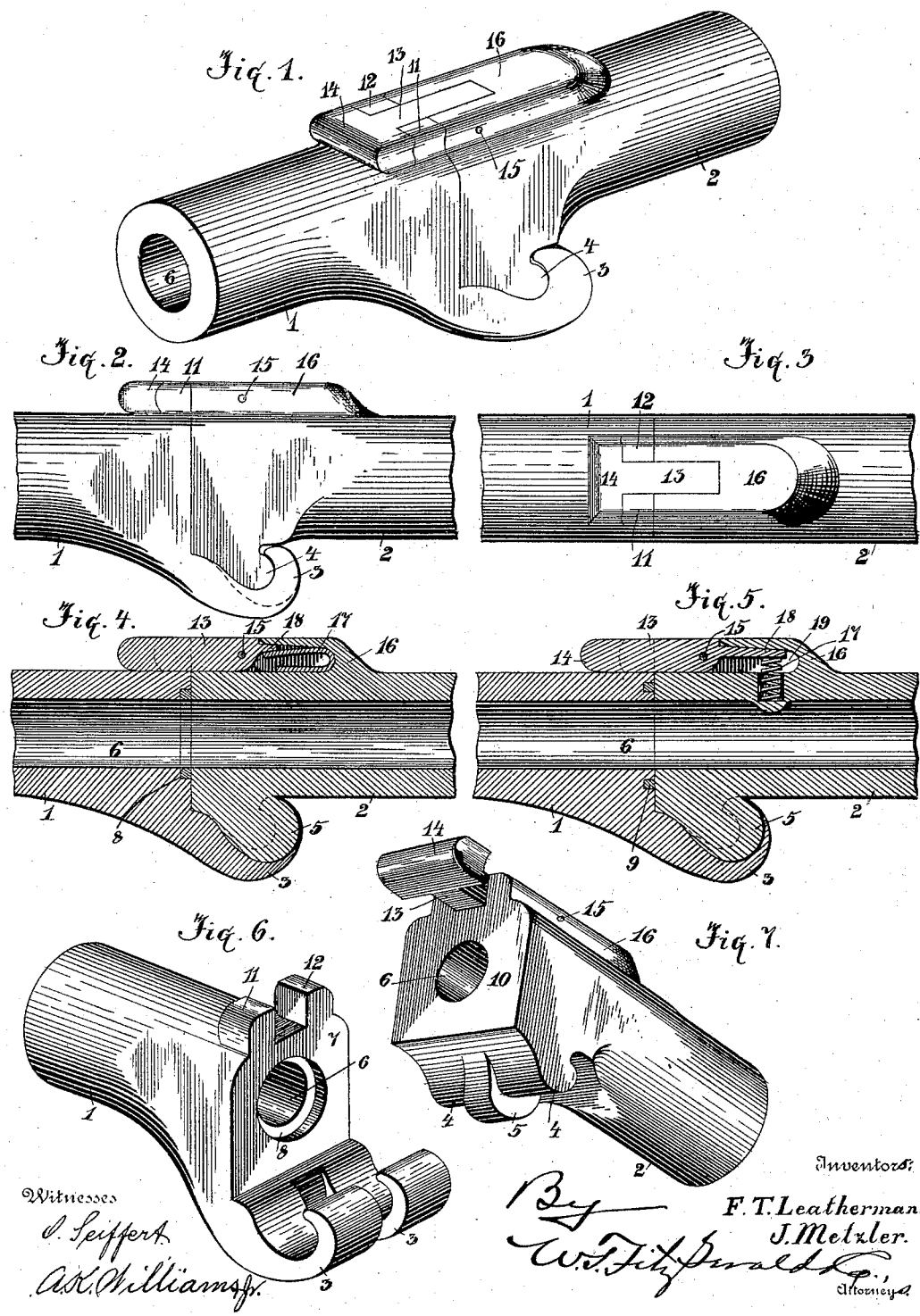

FRANKLIN T. LEATHERMAN AND JONAS METZLER, OF COLUMBIA CITY, INDIANA, ASSIGNORS OF ONE-THIRD TO H. D. McLALLEN AND W. F. McNAGNY, OF SAME PLACE.

PIPE-COUPLING.

SPECIFICATION forming part of Letters Patent No. 608,000, dated July 26, 1898.

Application filed September 11, 1897. Serial No. 651,358. (No model.)

*To all whom it may concern:*

Be it known that we, FRANKLIN T. LEATHERMAN and JONAS METZLER, citizens of the United States, residing at Columbia City, in the county of Whitley and State of Indiana, have invented certain new and useful Improvements in Pipe-Couplings; and we do hereby declare the following to be a full, clear, and exact description of the invention, such as will enable others skilled in the art to which it appertains to make and use the same.

Our invention relates to certain novel details of construction and arrangement of parts involved in the formation of a coupling device for hose and other similar purposes for which such a device is desirable.

Our invention will be fully illustrated in the accompanying drawings, described in the following specification, and pointed out in the claims.

The object of our invention, among others, is to provide a reliable means by which the different sections of a hose or other pipe may be reliably and expeditiously united and as quickly separated.

In the accompanying drawings, Figure 1 is a perspective view of our coupling complete ready to be attached to a hose, as by threads or other preferred means. Fig. 2 is a side elevation of Fig. 1. Fig. 3 is a top plan view of Fig. 2. Fig. 4 is a longitudinal central section of our coupling. Fig. 5 is a longitudinal section showing a different form of spring employed. Figs. 6 and 7 show parts of our coupling separated from each other and ready to be united.

Briefly stated, our invention consists in so forming the meeting ends of the members forming our coupling that they will readily engage each other; and our invention further consists in a locking-clasp which will hold the parts in their united position and which may be readily elevated when it is desired to separate the members.

Referring in detail to the several features involved in our invention, 1 and 2 are the members forming the body-section of our coupling, the former being provided with a pair of hooked terminals 3, adapted to engage the curved seats 4, formed upon the opposite member. The member 2 is also provided, in addition to the curved seats 4, with the intermediately-disposed curved rib 5, designed to snugly fit in the opening formed by the separation of the hooked terminals 3 upon the member 1.

Each of the members 1 and 2 is provided with a central aperture or bore 6, preferably of the same diameter, while the meeting face 7 of the member 1 is provided with an annular groove 8, formed directly in the edge of the bore 6, as shown in Fig. 4, or intermediate said bore and the outer side of the body, as shown in Fig. 5, the object being to provide a seat adapted to receive and retain the annular collar or rib 9, formed of rubber, leather, or other suitable material, the object, as will be readily appreciated, being to effect a tight closure or sealing of the meeting faces, and thus prevent the escape of the fluid conveyed by the tubular opening 6.

In forming the gasket or washer 9 we prefer to have it extend slightly beyond the plane of the face 7, thus insuring that it will be engaged by the face 10 of the member 2. Upon the upper side of the member 1, adjacent to the face 7 and forming a practical continuation thereof, we form the lugs or ears 11 and 12, between which is received the neck of the T-shaped locking-lever 13, said lever being provided with the transversely-disposed head 14, designed to lie beyond, though snugly in contact with, the ears 11 and 12.

In order to insure that the locking-lever 13 will reliably perform its office and snugly engage the ears 11 and 12, we prefer to pivot the same upon the bolt or rod 15, seated in the raised section 16, formed upon the upper side of the member 2. By this construction and arrangement of parts it will be readily apparent that the locking member 13 may be readily raised out of engagement with the ears 11 and 12 when it is desired to separate the members forming the coupling.

In order to normally hold the locking-lever 13 in a locked position when said member is in engagement with the member 1, we provide the spring 17, which, as illustrated in Figs. 4 and 5, may be a flat or spiral or any variety of spring, as preferred, the variety of spring employed being suitably accommodated within the raised section 16.

By reference to Figs. 4 and 5 it will be observed that the locking member 13 is provided with an extension 18, which projects beyond the rod 15 into the chamber 19, provided in the raised section 16, said chamber 19 being provided for the purpose of accommodating the springs 17.

By reference to Figs. 6 and 7 it will be seen that a hinge-like action of the parts occurs when said parts are being assembled in their operative positions—that is to say, the hooked terminals 3 will readily receive and yieldingly coact with the curved sections 4 and permit the faces 7 and 10 to be brought into close relationship, when the spring 17 will permit the section 14 to rise upward out of engagement with the ears 11 and 12, and when said faces are tightly brought together the section 14 will be forced downward by the spring 17 behind the ears 11 and 12, thus locking the members into close union with each other and so hold the same until the tension of the spring 17 has been overcome by raising the section 14, when the parts are freely separated.

The parts are so constructed and nicely adjusted when properly assembled in their respective operative positions that the members may be instantly attached to each other without any care being exercised on the part of the operator, as all that is necessary to be done is to simply bring about a hooked engagement of the hooked terminals 3 with the curved members 4, when by bringing said members into alinement or in the same plane with each other the section 14 will automatically rise upward over the ears 11 and 12 and snap downward behind the same, thus insuring that the parts cannot be casually displaced or unlocked without manually raising the section 14 out of engagement with said ears.

The advantages arising from the use of our improved coupling are due to the fact that great simplicity is involved in the construction, rendering it possible to expeditiously and cheaply manufacture the same and assemble the members thus formed in position or disengage the same from contact with each other.

Believing that the construction, operation, and advantages of our improved coupling device have been made fully apparent from the foregoing specification and the accompanying drawings, we will dispense with further description of the details involved.

Having thus fully described our invention, what we claim as new, and desire to secure by Letters Patent, is—

1. The herein-described coupling for hose, pipes, &c., consisting of the tubular members, one of which is provided upon its under side with a pair of hooks slightly separated from each other, while the opposite member is provided with a receiving-seat to engage said hooks, one of said members being additionally provided upon its upper side with a pair of ears, while the opposite member is provided with a locking-latch designed to engage said ears and a spring coöperating with said latch and designed to hold the same normally downward in engagement with said ears, all operatively combined in the manner and for the purpose set forth.

2. The herein-described coupling for hose, pipes, &c., consisting of the tubular members, one of which is provided upon its under side with a pair of hooks, while the opposite member is provided with a receiving-seat to engage said hooks, one of said members being additionally provided upon its upper side with a pair of ears, while the opposite member is provided with a locking-latch designed to engage said ears, suitable means for holding said latch normally downward in engagement with said ears and additional means for retaining a yielding collar of packing between the meeting faces of said tubular members, substantially as specified and for the purpose set forth.

In testimony whereof we affix our signatures in presence of two witnesses.

FRANKLIN T. LEATHERMAN.
JONAS METZLER.

Witnesses:
H. D. McLALLEN,
WM. F. McNAGNY.